(12) United States Patent
Servant et al.

(10) Patent No.: US 12,084,190 B2
(45) Date of Patent: Sep. 10, 2024

(54) AIRCRAFT TURBINE ENGINE

(71) Applicant: SAFRAN AIRCRAFT ENGINES, Paris (FR)

(72) Inventors: Regis Eugene Henri Servant, Moissy-Cramayel (FR); Didier Gabriel Bertrand Desombre, Moissy-Cramayel (FR); Christophe Paul Jacquemard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 248 days.

(21) Appl. No.: 17/754,078

(22) PCT Filed: Sep. 25, 2020

(86) PCT No.: PCT/FR2020/000243
§ 371 (c)(1),
(2) Date: Mar. 23, 2022

(87) PCT Pub. No.: WO2021/058882
PCT Pub. Date: Apr. 1, 2021

(65) Prior Publication Data
US 2022/0340290 A1    Oct. 27, 2022

(30) Foreign Application Priority Data
Sep. 27, 2019   (FR) ...................................... 1910693

(51) Int. Cl.
*F02C 7/36*     (2006.01)
*B64D 27/10*    (2006.01)

(52) U.S. Cl.
CPC ................ *B64D 27/10* (2013.01); *F02C 7/36* (2013.01); *F05D 2220/323* (2013.01); *F05D 2260/98* (2013.01)

(58) Field of Classification Search
None
See application file for complete search history.

(56) References Cited

U.S. PATENT DOCUMENTS

2012/0192570 A1*   8/2012   McCune .................... F02C 7/36
                                                        60/792
2015/0377065 A1*  12/2015   Deane .................... F01D 25/183
                                                        285/15

FOREIGN PATENT DOCUMENTS

EP   1378632 A2   1/2004
FR   3014478 A1   6/2015
(Continued)

OTHER PUBLICATIONS

International Search Report and Written Opinion received for PCT Patent Application No. PCT/FR2020/000243, mailed on Nov. 9, 2020, 15 pages (6 pages of English Translation and 9 pages of Original Document).

*Primary Examiner* — Todd E Manahan
*Assistant Examiner* — Rodolphe Andre Chabreyrie
(74) *Attorney, Agent, or Firm* — WOMBLE BOND DICKINSON (US) LLP

(57) ABSTRACT

The invention concerns an aircraft turbine engine (1), comprising a gas generator comprising at least one annular gas flow duct (2), the duct (2) being defined by two annular housings, respectively an external housing (3b) and an internal housing (3a), extending one around the other and connected together by at least one tubular arm (5) for the passage of a lubricating oil line (7). According to the invention, the line (7) comprises a first fixed section (14) secured to the external housing (3b), a second fixed section (16) secured to a piece of equipment (4) of the turbomachine capable of moving or vibrating during operation relative to the housings (3a, 3b), and an intermediate section (18) connecting the first and second sections (14, 16), this (Continued)

intermediate section (18) having a generally elongate shape and comprising longitudinal ends engaged and capable of swiveling and/or sliding in ends of the first and second sections (14, 16).

12 Claims, 4 Drawing Sheets

(56) References Cited

FOREIGN PATENT DOCUMENTS

| | | |
|---|---|---|
| FR | 3036437 A1 | 11/2016 |
| FR | 3041686 A1 | 3/2017 |
| FR | 3053387 A1 | 1/2018 |
| WO | 2013/162982 A1 | 10/2013 |

\* cited by examiner

[Fig.1]
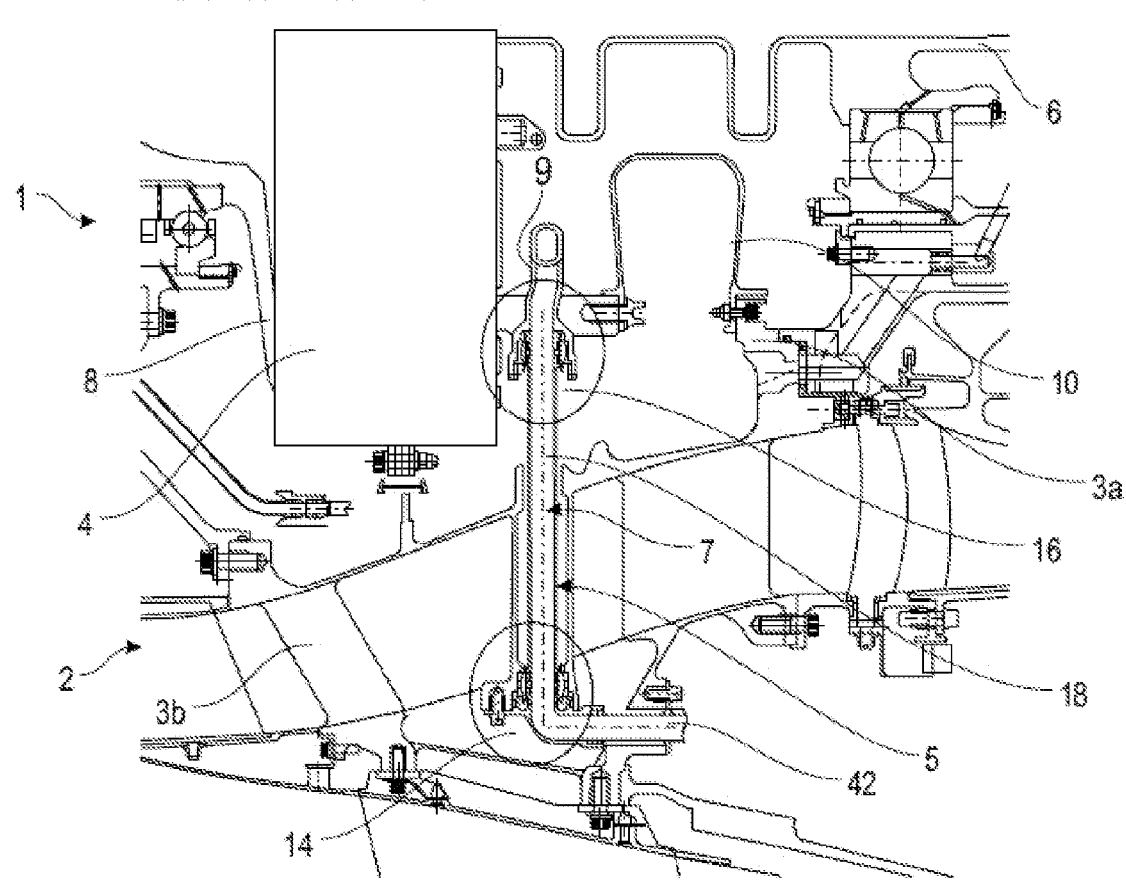

[Fig.2]
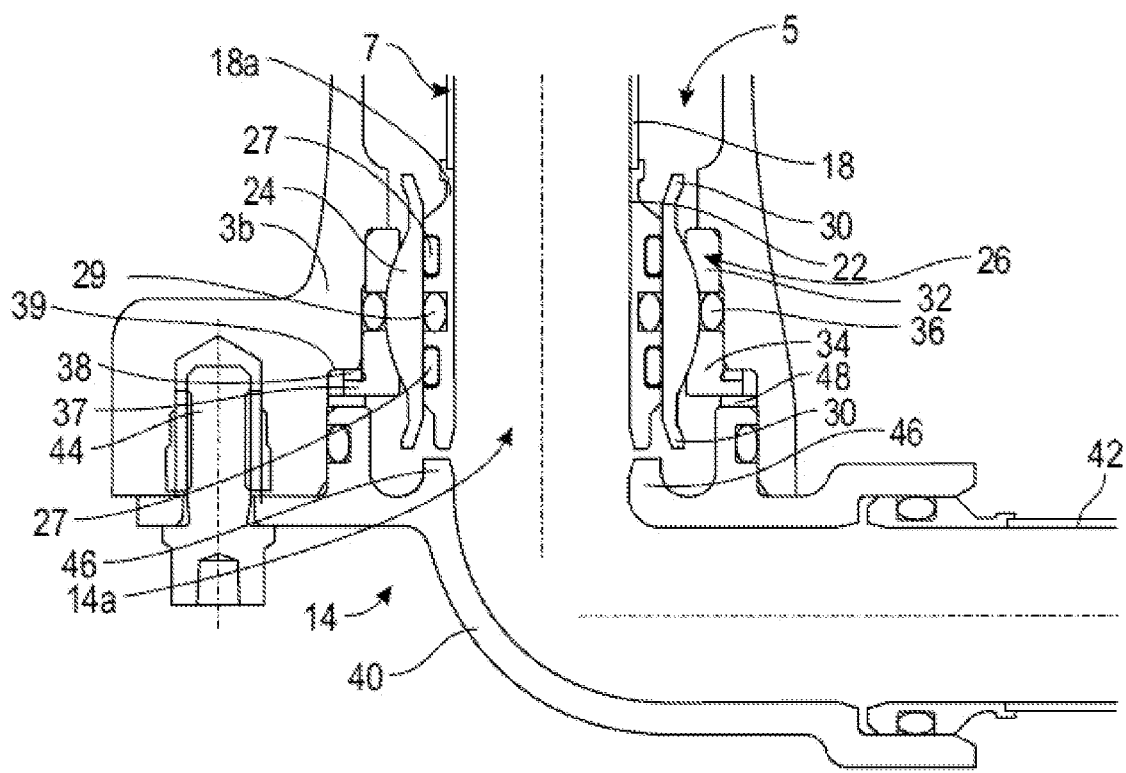

[Fig.3]
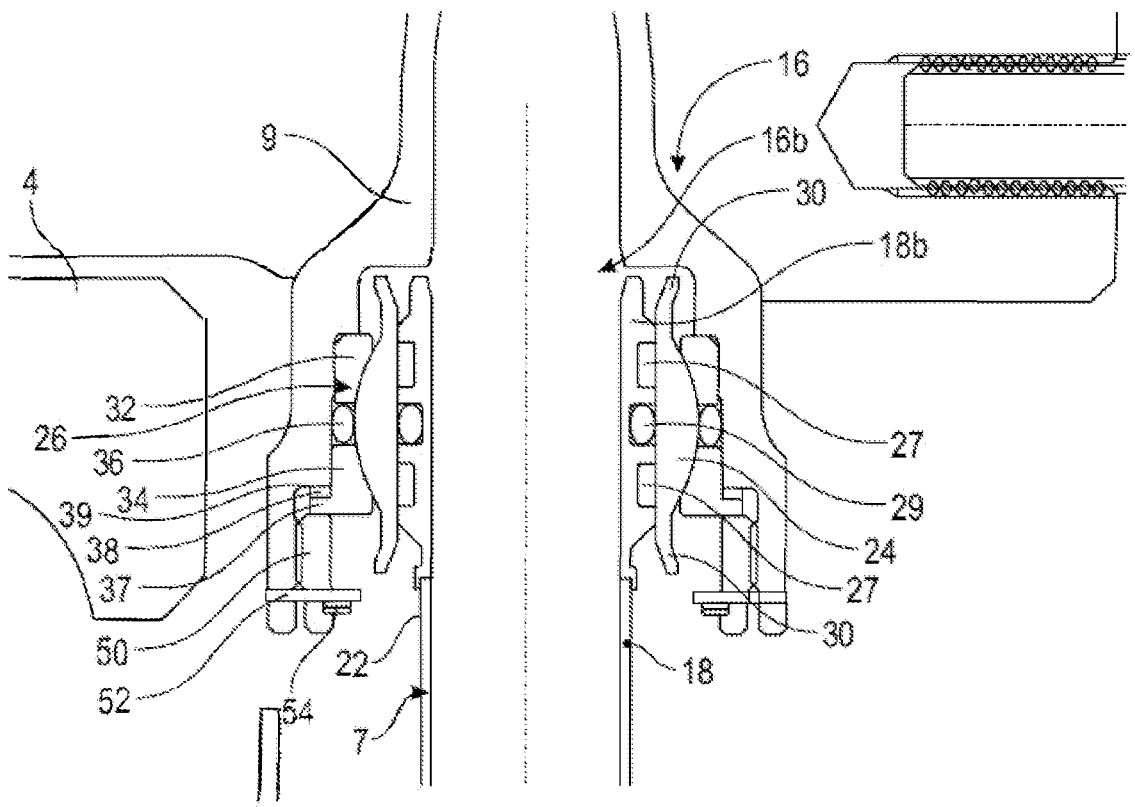

[Fig.4]
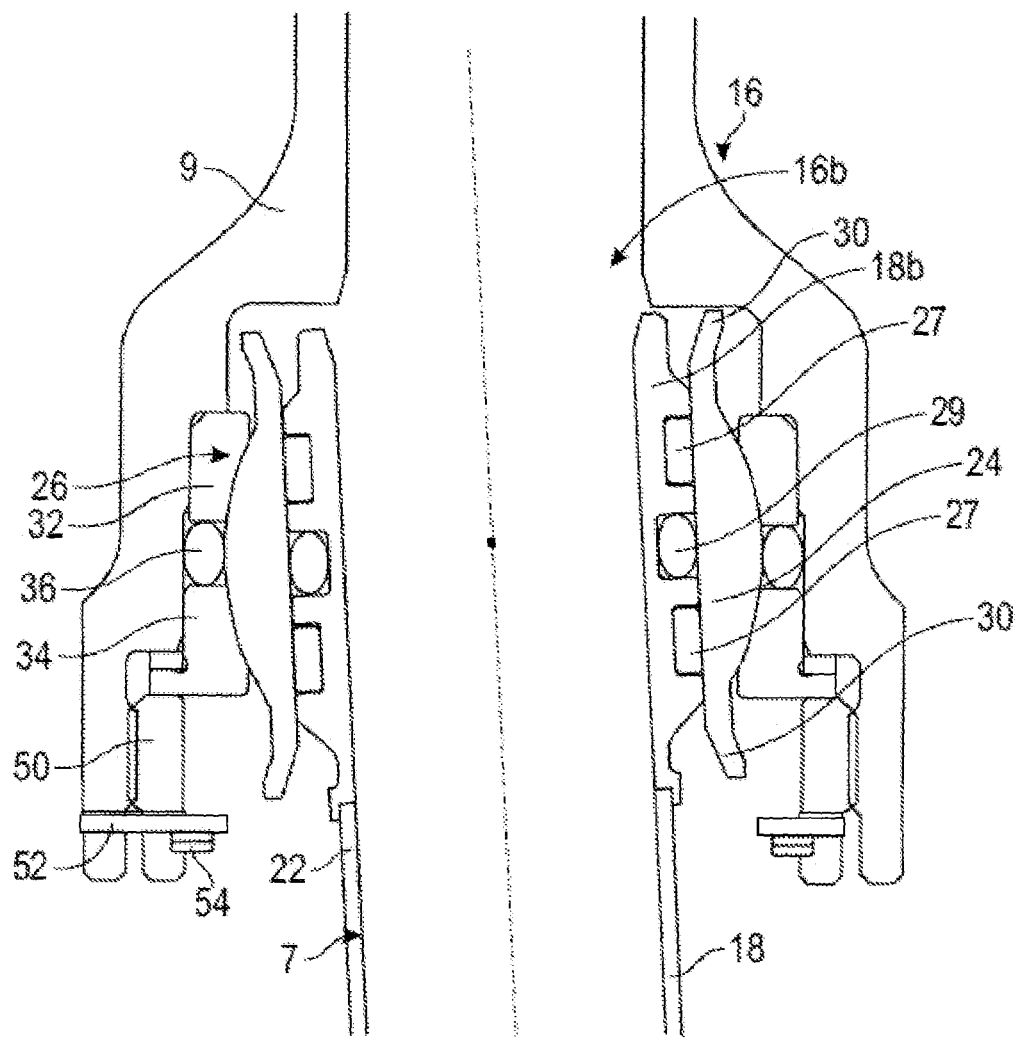

AIRCRAFT TURBINE ENGINE

TECHNICAL FIELD OF THE INVENTION

The present invention relates to the field of aeronautics, and more particularly to a turbine engine for an aircraft.

TECHNICAL BACKGROUND

The technical background comprises in particular the documents FR-A1-3 041 686, FR-A1-3 014 478, WO-A1-2013/162982, FR-A1-3 053 387, FR-A1-3 036 437 and EP-A2-1 378 632. It is known from the turbine engines with double-flow. Such turbine engines comprise one or more fans and a gas generator which generally comprises, from upstream to downstream in the direction of flow of the gases, an assembly of compressors, a combustion chamber and an assembly of turbines. An exhaust nozzle of the gases is arranged downstream of the gas generator. The fan or the fans are driven in rotation by one or more turbines by means of a mechanical transmission device, which generally comprises an RGB device (Reduction Gearbox). A system of passage of auxiliaries, comprising in particular oil supply lines, is also provided so that the auxiliaries can pass through a duct, such as a flow duct of a flow of air entering the engine portion, while minimizing the disturbances of this flow. This auxiliaries passage system allows to connect a first piece of equipment located radially inward of the duct to a second piece of equipment located radially outward of this duct. The auxiliaries passage system usually comprises a structural casing.

To allow the accommodation of the static, dynamic and thermal misalignments between the various parts of the turbine engine, the reduction gearbox is usually attached to the casing with a flexible support. During operation of the turbine engine, the reduction gearbox can therefore move in all directions by several millimetres relative to the casing, and it also generates vibrations.

These constraints make it difficult to design the lubricating oil supply or auxiliaries of the reduction gearbox, especially at the level of the sealing surfaces. As a general rule, the oil auxiliaries are made of tubes with O-rings at their ends, which transfer oil between two parts. However, if such a configuration works very well in the case of two static or quasi-static parts, the tightness of the assembly degrades greatly when there are relative movements or vibrations between the parts, because the O-rings are not adapted to work properly with this type of constraints. Indeed, such static O-rings are not effective when there is a significant misalignment between the parts they have to seal, in particular a misalignment of the order of one degree. Dynamic seals are known, but while they accept a reasonable amount of runout, the latter also do not tolerate misalignment between the parts. They are also very difficult to assemble because they are generally assembled by force, with a mallet.

There are also solutions based on ball joints referred to as sealed. However, the sealing of these ball joints only allows the grease used for their lubrication to remain inside the ball joints. Such ball joints are then inefficient to ensure the sealing of the assembly under the pressure of a hydraulic circuit in particular.

A known solution to support relative displacements between the parts, either in misalignment or in spacing, consists in making spherical bearing surfaces on the end pieces of the tube conveying the oil, on both sides of the seal. In operation, only the seal can dampen the metal-to-metal contacts between the tube and the hydraulic orifices provided in the parts. However, the seal cannot prevent such metal-to-metal contacts, especially when it settles under the effect of the compression. The metal-to-metal contacts then damage the bearing surface of the seal and the latter starts to leak, which is very detrimental to the efficiency and to the reliability of the assembly. The vibration phenomenon in the system also accelerate this wear.

Thus, and as it is generally not allowed to use flexible pipelines inside enclosures of an engine (risk of pollution, damage to the roller bearings or the gears if the pipelines degrade), there is a need to design oil pipelines that are rigid and tight, and compatible with relative displacements between the parts, whether in misalignment or in spacing.

In particular, the present invention is intended to solve in particular some or all of the above problems.

SUMMARY OF THE INVENTION

To this end, the invention proposes an aircraft turbine engine, comprising a gas generator comprising at least one annular gas flow duct, the duct being defined by two annular casings, respectively external and internal, extending one around the other and connected together by at least one tubular arm for the passage of a lubricating oil line.

According to the invention, the line comprises a first fixed section secured to the external casing, a second fixed section secured to a piece of equipment of the turbine engine capable of moving or vibrating during operation relative to said casings, and an intermediate section connecting said first and second sections, this intermediate section having a generally elongated shape and comprising opposite longitudinal ends which are each engaged and adapted to swivel and/or slide in ends of said first and second sections. In the present application, a "section" of a line is defined as a portion of the line which itself comprises an internal surface delimiting a flow duct for the oil inside the line. It is therefore understood that the sections of a line extend one after the other and are arranged substantially end-to-end and connected to each other or fitted into each other. This connection or this fitting advantageously allows the sections to swivel and/or slide relative to each other.

Thus, the invention allows to provide a rigid oil line for a turbine engine, and to allow relative displacements between the parts that it connects (whether in terms of misalignment or spacing), and this without prejudice to the overall sealing of the assembly. In fact, thanks to the longitudinal ends of the intermediate section of the oil line, which are engaged and adapted to swivel and/or slide in ends of the first and second sections of the line, the latter can follow the movements of a part in relative displacement with respect to the structural casing. This part may in particular be a reduction gearbox, without this being limiting in the context of the present invention.

In addition, such a configuration of the oil line allows to ensure the overall sealing of the system, regardless of the relative movement between the parts. The metal-to-metal contacts between the parts are advantageously avoided, thus preventing wear and tear that is detrimental to the service life of the seals. The reliability of the assembly is improved and the maintenance requirements are reduced.

Finally, such a configuration of the oil line is particularly compact and therefore easily integrated into the turbine engine.

The turbine engine according to the invention may comprise one or more of the following characteristics, taken alone with each other or in combination with each other:

the piece of equipment is a mechanical reduction gearbox;
the reduction gearbox comprises a stator to which the second section is attached;
the stator of the reduction gearbox is connected to the internal casing by an elastically deformable member;
each of the longitudinal ends of the intermediate section comprises an external cylindrical surface on which is slidably mounted an internal ring having a spherical external outline adapted to cooperate with an external ring carded by the corresponding fixed section;
the cylindrical surface comprises at least one annular groove for receiving an annular guiding segment and/or at least one annular groove for receiving an annular seal;
the external ring comprises a first annular portion shrunk into one end of the fixed section and a second annular portion fitted into this end;
an annular seal is interposed between said first and second portions;
said second portion comprises an external annular rim for bearing, on a cylindrical shoulder of the end of the fixed section, by means of an annular adjustment wedge; and
a nut, possibly associated with a locking device, is screwed into the end of the fixed section and bears axially on the second portion.

BRIEF DESCRIPTION OF THE FIGURES

The invention will be better understood and other details, characteristics and advantages of the present invention will become clearer from the following description made by way of non-limiting example and with reference to the attached drawings, in which:

FIG. 1 is a partial schematic view in longitudinal section of a turbine engine according to the invention;

FIG. 2 is an enlarged view of an embodiment detail of the turbine engine of FIG. 1, illustrating a ball joint system installed in a structural casing of the turbine engine;

FIG. 3 is an enlarged view of an embodiment detail of the turbine engine of FIG. 1, illustrating another ball joint system installed in a part of a reduction gearbox of the turbine engine; and FIG. 4 is a similar view to FIG. 3, illustrating the operation of the ball joint system as the oil transfer tube misaligns with respect to the receiving part of the ball joint system.

DETAILED DESCRIPTION OF THE INVENTION

On FIG. 1 and in the following description is represented a double-flow turbine engine 1 intended to equip an aircraft. However, the invention can be applied in the same way to other types of turbine engines.

The turbine engine 1 generally comprises, from upstream to downstream in the direction of flow of the gases, one or more fans and then an engine portion comprising one or more compressor stages, a combustion chamber, and one or more turbine stages. The fans, the compressors, the combustion chamber and the turbines are not shown in the figures for clarity. An annular gas flow duct 2 allows to supply air to the engine portion. A nozzle (not shown) is also arranged downstream to allow the escape of the gases. The fan or the fans are driven in rotation by one or more of the turbines by means of a mechanical transmission device, which comprises a reduction gearbox 4. As seen in FIG. 1, the reduction gearbox 4 has an input shaft 6, as well as an output shaft 8 connected to the fan or the fans.

The duct 2 allows the circulation of an air flow entering a primary circuit corresponding to the engine portion. The duct 2 is delimited by two annular casings, respectively an internal casing 3a and an external casing 3b, extending around each other and connected to each other by at least one tubular arm 5 for the passage of a lubricating oil line 7. This auxiliaries passage system, comprising the tubular arm 5 and the line 7, allows to connect a first piece of equipment located radially towards the outside of the duct 2 to a second piece of equipment located radially towards the inside of the duct (the expression radially being understood in relation to the longitudinal axis of the turbine engine). In this example, the first piece of equipment is a lubricating oil supply circuit (not shown), and the second piece of equipment is a part 9 ensuring the lubrication circuit for the reduction gearbox 4.

The reduction gearbox 4 is likely to move or vibrate during operation relative to the casings 3a, 3b. In the present example, the reduction gearbox 4 is connected to the internal casing 3a via an elastically deformable member 10. More specifically, the reduction gearbox 4 comprises a stator, which is connected to the internal casing 3a via the elastically deformable member 10. The elastically deformable member 10 is for example a flexible support.

The lubricating oil line 7 comprises a first fixed section 14, a second fixed section 16, and an intermediate section 18 connecting the first and second sections 14, 16. As can be seen in FIG. 1, the first fixed section 14 is secured to the external casing 3b, and the second fixed section 16 is secured to the reduction gearbox 4. In the present example, the second section 16 is attached to the stator of the reduction gearbox 4, more particularly to the part 9 ensuring the lubrication of the reduction gearbox, which part 9 belongs to the stator.

With reference to FIGS. 2 and 3, the intermediate section 18 has a generally elongated shape and comprises two longitudinal ends 18a, 18b engaged and adapted to swivel and/or slide in corresponding ends 14a, 16b of the first and second sections 14, 16. A first longitudinal end 18a of the intermediate section 18, visible in FIG. 2 and arranged in line with the arm 5, is thus engaged and adapted to swivel and/or slide in a corresponding end 14a of the first section 14. A second longitudinal end 18b of the intermediate section 18, visible in FIG. 3, is engaged and adapted to swivel and/or slide in a corresponding end 16b of the second section 16.

Each of these opposite longitudinal ends 18a, 18b of the intermediate section 18 comprises an external cylindrical surface 22 on which an internal ring 24 is slidably mounted. The internal ring 24 has a spherical external outline that is adapted to cooperate with an external ring 26 carried by the corresponding fixed section 14, 16, thus forming a ball joint system.

The external cylindrical surface 22 of each longitudinal end 18a, 18b comprises at least one annular groove for receiving an annular guiding segment 27 and/or at least one annular groove for receiving an annular seal 29. In the present example shown in FIGS. 2 and 3, the cylindrical surface 22 comprises two annular grooves for receiving an annular guiding segment 27, and an annular groove for receiving an annular seal 29. In the present example, for each longitudinal end 18a, 18b, the annular seal 29 is arranged between the two guiding segments 27 present on that end. The annular seal 29 is for example an O-ring. Alternatively, not shown, the annular seal 29 may be formed by a more elaborate seal than an O-ring, such as a seal combined with a friction ring for example.

The two guiding segments 27 present on each end 18*a*, 18*b* allow to prevent wear by metal-to-metal contact between the oil line 7 and the internal rings 24, thus preventing leakage. The guiding segments 27 also force the ball joint systems to align with the oil line 7 as it moves. They also allow to control the crushing of the annular seal 29, all to the benefit of the service life and the efficiency of the seal. The guiding segments 27 also allow to provide better resistance to the vibratory stresses generated by the reduction gearbox 4.

In order to facilitate the assembly and to avoid damage to the guiding segments 27 and the annular seals 29, the internal ring 24 mounted on the first longitudinal end 18*a* of the intermediate section 18 is provided with a chamfer 30 at each of its ends. When the oil line 7 is dismantled, the guiding segments 27 and the annular seal 29 of the second longitudinal end 18*b* on the reduction gearbox side will have to be compressed again in order to pass through the internal ring 24 mounted on the first end 18*a* on the external casing side. To save cost, and even though it is not useful for the assembly of the oil line 7 per se, the internal ring 24 mounted on the second longitudinal end 18*b* of the intermediate section 18 also comprises these two inlet chamfers 30. Thus, exactly the same parts 24 form part of the ball joint systems on the external casing 3*b* side and on the reduction gearbox 4 side.

Preferably, the external ring 26 comprises a first annular portion 32 shrunk into one end 14*a*, 16*b* of the corresponding fixed section 14, 16; and a second annular portion 34 fitted into that end 14*a*, 16*b*. An annular seal 36 is interposed between the first and second annular portions 32, 34 of each external ring 26. Such a configuration for the ball joint systems, combining an internal ring 24 with a spherical external outline, and an external ring 26 in two portions 32, 34, allows to ensure that the systems are sealed and can withstand the pressure of the oil supply circuit.

The second annular portion 34 of each external ring 26 comprises an external annular rim 37 for bearing on a cylindrical shoulder 39 of the end 14*a*, 16*b* of the corresponding fixed section 14, 16, by means of an annular adjustment wedge 38. Such a wedge 38, the thickness of which is adjustable, allows to control the operating clearance or tightness between the internal ring 24 and the annular portions 32, 34 of the external ring 26 (according to the recommendations of the manufacturer of these rings), and thus to ensure that the ball joint system operates under optimal conditions.

The annular seal 36 is for example an O-ring. Alternatively, not shown, the annular seal 36 may be formed by a more elaborate seal than an O-ring, such as a seal associated with a friction ring for example.

When mounted, the first annular portion 32 of each external ring 26 is shrunk-fitted and abutted in a bore of the corresponding receiving part 3*b*, 9. Then the internal ring 24 is slid through the first annular portion 32. Then the annular seal 36 is put in place. Finally, the second annular portion 34 of the external ring 26 is slid around the internal ring 24 to capture the seal 36. This second annular portion 34 can be slidably mounted, or very slightly tightened in the receiving part 3*b*, 9. The annular seal 36 then operates under near-normal conditions. Only the fact that it relates to the sphere of the internal ring 24 differs from a usual assembly. The adjustment wedge 38 is installed beforehand on the second annular portion 34 of the external ring 26 before finalizing the assembly of the ball joint system, and the adjustment of the tightening torque is carried out via this wedge 38. With reference to FIG. 2, the first fixed section 14 comprises a cover 40 that closes the orifice defined by the first longitudinal end 18*a* of the intermediate section 18. The cover 40 allows to hold the corresponding ball joint system 24, 26 in position in the external casing 3*b*. The cover 40 further connects the intermediate section 18 of the line 7 with an oil supply tube 42 connected to the oil supply circuit. The cover 40 is attached to the external casing 3*b*, for example by means of one or more screws 44. Such an assembly with cover 40 is particularly advantageous in the case where the receiving part cannot be threaded, which is the case of the external casing 3*b*. Preferably, and as seen in FIG. 2, the cover 40 is provided with at least one stop 46, in this case two stops 46 extending on either side of the line 7 in this example. The stops 46 are configured to prevent the guiding segments 27 from moving out of the internal rings 24 of the ball joint systems by limiting the radial displacement of the line 7. However, they leave sufficient displacement path to allow the oil line 7 to accommodate the relative displacements between the reduction gearbox 4 and the casings 3*a*, 3*b*, and the thermal expansions. At the other end of the line 7, the geometry of the part 9 also provides a stop for the line 7.

In this particular configuration shown in FIG. 2, an annular counter wedge 48 is inserted between the cover 40 and the external annular rim 37 of the second annular portion 34 of the external ring 26, on the side of the rim 37 opposite that at the level of which the adjustment wedge 38 is arranged. The counter wedge 48, which is adjustable in thickness, allows to fill the clearance between the external ring 26 and the cover 40. The ball joint system 24, 26, which has already been adjusted by the adjusting wedge 38, is thus effectively pressed down by the action of the counter wedge 48.

Referring to FIG. 3, a nut 50 associated with a nut 50 braking and locking device 52 is screwed into the corresponding end 16*b* of the second fixed section 16. The nut 50 is axially supported on the second annular portion 34 of the external ring 26 such that the nut 50, when tightened, holds the corresponding ball joint system 24, 26 in position in the part 9. Advantageously, an elastic annulus 54 is coupled to the braking and locking device 52 to improve the efficiency of the assembly.

For the installation of the oil line 7, once the two ball joint systems are installed in the receiving parts 3*b*, 9, the line 7 is installed between them. For this purpose, the line 7 is passed through the ball joint system installed in the external casing 3*b*. Then it is pushed inside the tubular arm 5, to engage in the ball joint system installed in the part 9 ensuring the lubrication of the reduction gearbox 4. The assembly is enclosed by the assembly of the cover 40 and the counter wedge 48.

FIG. 4 illustrates the operation of the ball joint system 24, 26 of FIG. 3 when the oil line 7 misaligns with respect to the part 9 receiving the ball joint system. Once installed between the two ball joint systems, the oil line 7 causes them to rotate as the reduction gearbox 4 moves relative to the casings 3*a*, 3*b*. The two ball joint systems, connected to the line 7, form sealed, swiveling hydraulic connection orifices. It is thus conceivable that the invention allows to provide a rigid oil line 7 for the turbine engine 1, and which allows relative displacements between the parts 3*a*, 9 that it connects (whether in misalignment or in spacing), and this without prejudice to the overall sealing of the assembly.

Although the present invention has been described with reference to a reduction gearbox and a structural casing of a turbine engine, it is equally applicable to any part of a turbine engine requiring an oil supply, with the presence of relative displacements (whether in misalignment or in spacing) between that part and the structural casing.

The invention claimed is:

1. An aircraft turbine engine, comprising a gas generator comprising at least one annular gas flow duct, the duct being defined by two annular casings, respectively external and internal, extending one around the other and connected together by at least one tubular arm for the passage of a lubricating oil line, wherein the line comprises a first fixed section secured to the external casing, a second fixed section secured to a piece of equipment of the turbine engine capable of moving or vibrating during operation relative to said casings, and an intermediate section extending between said first and second sections, said intermediate section having a generally elongated shape and comprising a first longitudinal end which is engaged and suitable to swivel and slide in an end of said first section through a first ball joint system and a second longitudinal end which is opposite to said first longitudinal end and which is engaged and suitable to swivel and slide in an end of said second section through a second ball joint system.

2. The turbine engine according to claim 1, wherein the piece of equipment is a mechanical reduction gearbox.

3. The turbine engine according to claim 2, wherein the reduction gearbox comprises a stator to which the second section is attached.

4. The turbine engine according to claim 3, wherein the stator of the reduction gearbox is connected to the internal casing by an elastically deformable member.

5. The turbine engine according to claim 1, wherein each of the longitudinal ends of the intermediate section comprises an external cylindrical surface on which is slidably mounted an internal ring having a spherical external outline adapted to cooperate with an external ring carried by the corresponding fixed section.

6. The turbine engine of claim 5, wherein the cylindrical surface comprises at least one annular groove for receiving an annular guiding segment and/or at least one annular groove for receiving an annular seal.

7. The turbine engine according to claim 5, wherein the external ring comprises a first annular portion shrunk into one end of the fixed section and a second annular portion fitted into this end.

8. The turbine engine according to claim 7, wherein an annular seal is interposed between said first and second portions.

9. The turbine engine according to claim 7, wherein said second portion comprises an external annular rim for bearing on a cylindrical shoulder of the end of the fixed section, by means of an annular adjustment wedge.

10. The turbine engine according to claim 9, wherein a nut is screwed into the end of the fixed section and bears axially on the second portion.

11. The turbine engine according to claim 10, wherein a locking device is associated with said nut.

12. An aircraft turbine engine, comprising a gas generator comprising at least one annular gas flow duct, the duct being defined by two annular casings, respectively external and internal, extending one around the other and connected together by at least one tubular arm for the passage of a lubricating oil line, wherein the line comprises a first fixed section secured to the external casing, a second fixed section secured to a piece of equipment of the turbine engine capable of moving or vibrating during operation relative to said casings, and an intermediate section connecting said first and second sections, this intermediate section having a generally elongated shape and comprising opposite longitudinal ends which are each engaged and adapted to swivel and slide in ends of said first and second sections through a ball joint system, wherein each of the longitudinal ends of the intermediate section comprises an external cylindrical surface on which is slidably mounted an internal ring having a spherical external outline adapted to cooperate with an external ring carried by the corresponding fixed section, said external ring comprising first and second annular portions independent one from another.

* * * * *